United States Patent [19]
Watanabe et al.

[11] Patent Number: 6,115,669

[45] Date of Patent: *Sep. 5, 2000

[54] NAVIGATION SYSTEM FOR VEHICLES AND WAYPOINT ENTERING AND STORAGE METHOD

[75] Inventors: Kazuyuki Watanabe; Akimasa Nanba, both of Anjo, Japan

[73] Assignee: Aisin AW Co., Ltd., Anjo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/762,421

[22] Filed: Dec. 9, 1996

[30] Foreign Application Priority Data

Feb. 1, 1996 [JP] Japan ................................. 8-016932
Feb. 1, 1996 [JP] Japan ................................. 8-016933

[51] Int. Cl.$^7$ ............................. G01C 21/00; G06G 7/78
[52] U.S. Cl. ........................ 701/209; 701/208; 701/211; 340/988; 340/990; 340/995; 73/178 R
[58] Field of Search .................... 701/200, 201, 701/202, 206, 208, 209, 211, 212; 340/988, 990, 995, 996, 460, 692; 342/457, 357, 357.13, 452, 176, 183, 184; 73/178 R

[56] References Cited

U.S. PATENT DOCUMENTS

| | | | |
|---|---|---|---|
| 4,675,676 | 6/1987 | Takanabe et al. | 701/212 |
| 4,758,959 | 7/1988 | Thoone et al. | 701/221 |
| 4,763,270 | 8/1988 | Itoh et al. | 701/209 |
| 4,914,605 | 4/1990 | Loughmiller, Jr. | 701/200 |
| 4,943,925 | 7/1990 | Moroto et al. | 701/211 |
| 5,067,082 | 11/1991 | Nimura et al. | 701/208 |
| 5,107,433 | 4/1992 | Helldorfer et al. | 701/202 |
| 5,122,959 | 6/1992 | Nathanson et al. | 701/117 |
| 5,168,452 | 12/1992 | Yamada et al. | 701/202 |
| 5,197,009 | 3/1993 | Hoffman, Jr. et al. | 701/200 |
| 5,268,844 | 12/1993 | Carver et al. | 701/200 |
| 5,274,560 | 12/1993 | LaRue | 701/202 |
| 5,289,195 | 2/1994 | Inoue | 701/208 |
| 5,471,393 | 11/1995 | Bolger | 701/217 |
| 5,475,598 | 12/1995 | Fushimi et al. | 701/202 |
| 5,508,917 | 4/1996 | Siegle et al. | 701/207 |
| 5,537,324 | 7/1996 | Nimura et al. | 701/208 |
| 5,559,511 | 9/1996 | Ito et al. | 701/201 |
| 5,652,706 | 7/1997 | Morimoto et al. | 701/210 |
| 5,682,525 | 10/1997 | Bouve et al. | 701/300 |
| 5,765,123 | 6/1998 | Nimura et al. | 701/208 |
| 5,802,492 | 9/1998 | DeLorme et al. | 701/211 |
| 5,850,618 | 12/1998 | Suetsugu et al. | 701/211 |
| 5,941,930 | 8/1999 | Morimoto et al. | 701/208 |

FOREIGN PATENT DOCUMENTS

| | | |
|---|---|---|
| 0 550 399 | 7/1993 | European Pat. Off. . |
| 0 580 157 | 1/1994 | European Pat. Off. . |
| 0 588 082 | 3/1994 | European Pat. Off. . |

*Primary Examiner*—Jacques H. Louis-Jacques
*Attorney, Agent, or Firm*—Oliff & Berridge, PLC

[57] ABSTRACT

The invention is characterized in that the street and street number of a waypoint, or of a point nearest to the waypoint, is located and input by an input means whereby the desired street name and street number are entered and stored as the waypoint name. In case the street name of the waypoint, or of a point nearest to the waypoint, cannot be found, the name of facility nearest to the waypoint, or the longitude and latitude of the waypoint, is entered and stored as the waypoint name.

13 Claims, 15 Drawing Sheets

(a) STREET DATA

| NUMBER OF STREETS (n) | |
|---|---|
| 1 | STREET NUMBER |
| | LENGTH |
| | STREET NAME |
| | DISPLAY REPRESENTATIVE POINT- EASTERN LONGITUDE COORDINATE |
| | DISPLAY REPRESENTATIVE POINT- NORTHERN LATITUDE COORDINATE |
| | DISPLAY SCALE |
| | STREET ATTRIBUTE DATA |
| | ADDRESS AND SIZE OF SHAPE DATA |
| | ADDRESS AND SIZE OF GUIDANCE DATA |
| ⋮ | ⋮ |
| n | ⋮ |

(b) SHAPE DATA

| NUMBER OF NODES (m) | |
|---|---|
| 1 | EASTERN LONGITUDE COORDINATE |
| | NORTHERN LATITUDE COORDINATE |
| | STREET NUMBER |
| | ⋮ |
| m | |

(c) GUIDANCE DATA

| INTERSECTION DATA |
|---|
| PRECAUTION DATA |
| STREET NAME DATA |
| ADDRESS AND SIZE OF STREET NAME VOICE DATA |
| ADDRESS AND SIZE OF DESTINATION DATA |

(d) DESTINATION DATA

| NUMBER OF DESTINATIONS (k) | |
|---|---|
| 1 | DESTINATION STREET NUMBER |
| | DESTINATION NAME |
| | ADDRESS AND SIZE OF DESTINATION NAME VOICE DATA |
| | DESTINATION DIRECTION DATA |
| | DRIVING GUIDANCE DATA |
| | ⋮ |
| k | |

(e) DESTINATION DIRECTION DATA

-1 : INVALID
0 : NOT NECESSARY
1 : STRAIGHT AHEAD
2 : RIGHTWARD DIRECTION
3 : DIAGONALLY RIGHTWARD DIRECTION
4 : DIRECTION TO RETURN TO RIGHT
5 : LEFTWARD DIRECTION
6 : DIAGONALLY LEFTWARD DIRECTION
7 : DIRECTION TO RETURN TO LEFT

NAVIGATION SYSTEM FOR VEHICLES AND WAYPOINT ENTERING AND STORAGE METHOD

BACKGROUND OF THE INVENTION

The invention relates to a navigation system for vehicles, in which position data such as destination, transit point, present position, etc. are input and stored, and the stored position data is read and used for example, to set a destination, to pinpoint a stored position using street information, to display a street selected by a user adequately on a screen, and to store a position or a point, among other functions.

In a navigation system for vehicles used on a vehicle such as an automobile for providing route guidance, it is general practice to store a position such as a destination, a transit point, a facility to be observed, etc. in advance, and this stored data is used to set a destination or for other purposes.

For example, when a guidance screen of a navigation system is displayed, the cursor is moved on the screen using a remote control device, and when the cursor comes to a waypoint, the input instruction key is operated. Then, a mode option such as destination, transit point, waypoint and present position are displayed as shown in FIG. 1. When the waypoint is selected, a facility, which is at the position nearest to cross cursor is located. Then, as shown in FIG. 2, the name of the facility "ABC" is displayed together with a waypoint storage number, mark, telephone number, etc. When the waypoint button is pressed, the facility is entered and stored as a waypoint. The stored position can now be displayed in the list. For example, a list can be displayed as shown in FIG. 2, and when the destination button is pressed, the waypoint is set as the destination.

In the storage of a waypoint as described above, a facility is located whose central coordinates are nearest to the waypoint, and the name of the facility is then entered and stored. Accordingly, it is probable that a name of a facility considerably far from and having no relation to the waypoint, may be stored, and it may be difficult to find the position of the waypoint from the facility's name in such case.

Also, a street name may be used to input a destination, present position, etc. because a street name is generally used to indicate an address or location in Europe and America, for example. If a street name is input and a road map is displayed on the guidance screen, a map of the vicinity of the location is displayed by aligning a representative point of the input street, e.g., the center of the street, with the center of the screen.

However, streets vary in length. When the vicinity of a street is displayed by aligning the representative point with the center of the screen, the desired position, street, etc. may be off the screen, making it difficult for the driver to reach the destination.

The objects of the invention are: 1) to pinpoint the position of a waypoint in the waypoint storage; 2) to correctly display a street on the guidance screen regardless of street length; 3) to clearly identify the desired street and to display the address.

SUMMARY OF THE INVENTION

In the navigation system for vehicles having the capability to enter and store waypoints, a street nearest to the entered waypoint is located. The street address is calculated from a row of nodes on the desired street, and the street and address are entered and stored as the name of the waypoint. Since a street name is generally used to indicate an address or location in Europe and America, for example, by using a street name and address as the name of the waypoint in the waypoint storage, it is possible to pinpoint the position of the waypoint.

In addition, according to the invention, when a street name is input, a displayed representative point from the street selection data and street shape data (node) are read. If a reduced scale is set in advance, it is read directly. If not set in advance, the reduced scale is calculated, and a map is drawn so that the entire length of the desired street can be displayed on the guidance screen.

Also, because a plurality of streets are displayed on the guidance screen, the desired street and address may be displayed in different colors or in a flashing mode so that the street number can be selected on the desired street. Because the street number is displayed in this manner, the entire street can be shown regardless of length making it possible to clearly identify the entered street and address and to easily set destination, present position, etc. by street name.

BRIEF DESCRIPTION OF THE DRAWINGS

FIG. 4 shows the road data structure;

DESCRIPTION OF THE PREFERRED EMBODIMENTS

A description of the embodiments of the invention will be given in reference to the drawings.

Figure 3:
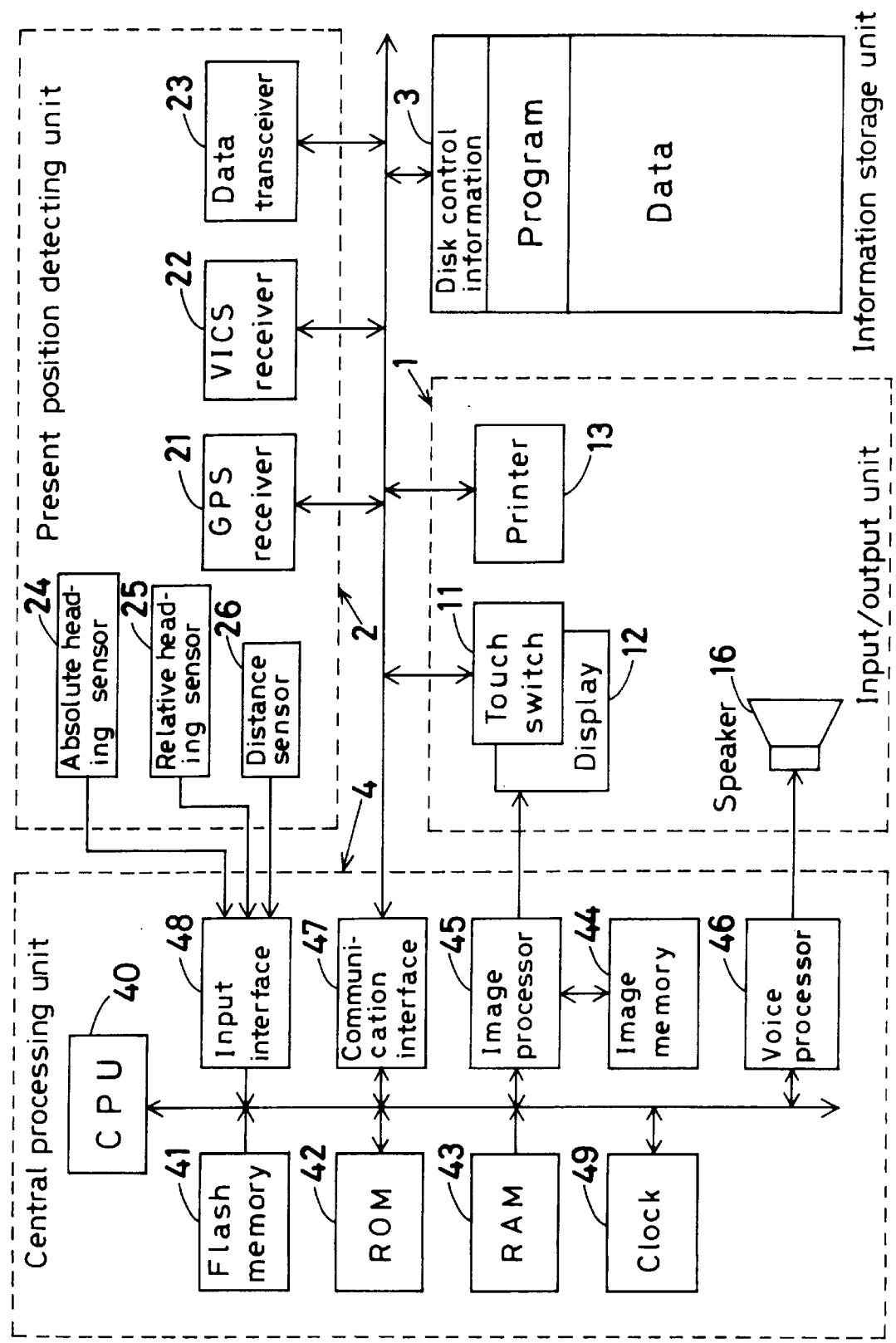
FIG. 3 shows an example of an arrangement of a navigation system according to the invention.

The navigation system for vehicles according to the invention comprises, as shown in FIG. 3, an input/output unit 1 for inputting and outputting information relating to route guidance; a present position detecting unit 2 for detecting information relating to the present position of the vehicle; an information storage unit 3 for recording navigation data for calculating the route, guidance data for display/voice for route guidance and programs (application and/or operating system (OS)), etc.; and a central processing unit 4 for processing route location, display/voice guidance, and for providing overall control of the system.

The input/output unit 1 instructs the central processing unit 4 to carry out navigation processing when the driver inputs a destination, outputs guidance information by voice and/or on screen when needed, and prints out the processed data. As means to fulfill such functions, the input unit comprises a touch switch 11 or an operation switch to input a destination by telephone number, coordinates on a map, etc., and to request route guidance. Naturally, an input unit such as a remote control may be used. The output unit comprises a display 12 for displaying input data on a screen and for automatically displaying route guidance on screen in response to a request by the driver; a printer 13 for printing out data processed by the central processing unit 4 or data stored in the information storage unit 3; and a speaker 16 for providing route guidance audibly.

Here, a voice recognizer which provides information by voice or a card reader for reading the recorded data in an IC card or magnetic card form, may be added. It is also possible to add a data communication device, which inputs and receives data from an information center where data necessary for navigation is accumulated and provided via communication lines (e.g. modem, etc.) at the driver's request, or to and from an information source, such as note type electronic device where driver specific data such a map and destination data, etc. are stored in advance.

The display 12 comprises a color CRT or a color liquid crystal unit for displaying map data processed by the central processing unit 4 required for navigation, such as route setting screen, sector view screen, intersection view screen, etc. based on the guidance data in color display; and buttons for route guidance settings and for toggling between the various screens. In particular, intersection information, such as the name of an intersection, is displayed in color on the sector view screen, as necessary.

The display 12 is provided on an instrument panel near the driver's seat. By watching the sector view, the driver can confirm the present position of the vehicle and obtain information on the route ahead. The display 12 is provided with a touch switch 11. By touching the button, the above operation can be carried out based on the input signal. The input signal generating means comprising the button and the touch switch, constitutes the input unit. (A detailed description is not given here.)

The present position detecting means 2 comprises a Global Positioning System (GPS) receiver 21 for obtaining information using a GPS to detect the present position of the vehicle; a Vehicle Information and Communication Service (VICS) information receiver 22 for obtaining information using an FM multiplex radio beacon, optical beacon, etc.; a data transceiver 23 for carrying out two-way communication of information with an information center (such as ATIS) or other vehicles using a portable telephone, personal computer, etc.; an absolute heading sensor 24 for detecting the direction of movement of the vehicle by using geomagnetism, for example; a relative heading sensor 25 for detecting the direction of movement of the vehicle in a relative direction using a steering sensor, gyro sensor, etc.; and a distance sensor 26 for recording the distance traveled by the vehicle from number of wheel revolutions, for example. The unit also transmits and receives other data, such as road or traffic information, as well as data relating to the present position of the vehicle.

The information storage unit 3 is an external storage unit for storing programs and data for navigation and comprises a CD-ROM, for example. The stored programs include, a program for route location processing; a display output control program for route guidance and voice guidance; data necessary for such purposes; and display information for route guidance and map display. The stored data comprises files, such as map, location, node, street, guidance, map matching, destination, waypoint, road, landmark data, etc., and all other data necessary for the navigation system. The invention is also applicable to a type of unit, where data is only stored in CD-ROM and the programs are stored in the central processing unit.

The central processing unit 4 comprises a CPU 40 for executing various type of computation; a flash memory 41 for reading and storing programs from the CD-ROM of the information storage unit 3; a ROM 42 for storing, reading and checking programs and updating the flash memory 41; a RAM 43 for temporarily storing route guidance information for the desired route, such as position coordinates of the preset destination, road name code number, and other data under computation; an image memory 44 where image data used for the screen display can be stored; an image processor 45 for accessing image data from the image memory 44 based on the display output control signal from the CPU 40 and the processed data to the display; a voice processor 46 for synthesizing a voice, phrase, comprehensive sentence, sound, etc. which is read from the information storage unit 3 based on the voice output control signal from the CPU, and converts the processed sound to analog signals and outputs to the speaker 16; a communication interface 47 for receiving input/output data; a sensor input interference 48 for incorporating the sensor signal of the present position detecting unit 2; and a clock 49 for inputting data and time to internal dialog information. Here, route guidance is provided by a screen display and voice output. The driver can also deselect the voice output. The updating program as described above may also be stored in the external storage unit.

The program relating to the invention as well as other navigation programs may be stored in CD-ROM, serving as an external storage medium. As an alternative, a part or all of these programs may be stored in ROM 42 on the main unit.

When the data or programs stored in the external storage medium are input to the main unit's central processing unit as external signals and processed by computation, various navigation functions are accomplished.

The navigation system according to the invention comprises a flash memory 41 of relatively large capacity able read programs from the CD-ROM of the external storage unit as described above and small capacity ROM 42 where programs for start-up processing of the CD (program reading means) are stored. The flash memory 41 is a storage means where stored information can be maintained even when power is suspended, i.e., a nonvolatile storage means. In the start-up processing of the CD, the ROM program 42, serving as the program reading means, starts by checking the program stored in the flash memory 41, then reads the disk control information of CD-ROM in the information storage unit 3. The loading of the programs (updating processing) is performed based on a determination from the stored information and the status of flash memory 41.

FIG. 4 shows an example of an arrangement of a major data file stored in the information storage unit 3 of the invention. FIG. 4 shows a guidance street data file where the route by route calculating means and route guidance data are stored. For each of "n" (quantity) streets, the data includes a street number, length, street name, coordinates in longitude and latitude of the displayed representative point, display scale set in such manner that the entire street in question is within the screen or within a given display area on the screen, street attribute data, address and size and shape data, and address and size the guidance data. The street number is set for each direction (outward course and return course) for each street between the branch points. The displayed representative points are properly set in such manner that the same number of points are arranged at equal spacing for each street or the number of representative points is made different to match the length of the street. The street attribute data, serving as auxiliary information data for street guidance, consists of information as to whether the street is an overpass, a road alongside an overpass, an underpass, a road alongside an underpass or the number of lanes, for example.

The shape data have, as shown in FIG. 4, coordinate data of longitude and latitude to each of several meters of nodes when each street is divided into a plurality of node and street number data corresponding to the node. From a row of the nodes, the shape of the street is determined, and the display scale is then determined from the street shape data.

The display scale ratio may not be set in advance as described above, and may be obtained by calculation when the map is drawn.

For example, coordinates of the notes of the street shape data are already known, so all node coordinates of the street may be converted to coordinates on the screen. A display area capable of displaying the entire street and the display scale ratio may then be calculated so that the calculated display area can be displayed in a given display area on the screen.

As another method to obtain a display scale ratio, a search is started from the most detailed display scale ratio (i.e., the smallest scale ratio), and the display scale ratio is increased until all nodes of the street in question are within the screen or within a given display area on the screen. The scale ratio can be determined when it is determined that all nodes can be displayed.

The method to determine the display scale ratio will be described in detail later.

The guidance data includes, as shown in FIG. 4, intersection (or branch point) names, precaution data, street name data, address and size of street name voice data, and address and size of destination data. The precaution data are the data giving information on railroad crossing, tunnel entrance, tunnel exit, road narrowing points, no information, etc. and the data which gives warning to the driver at a railroad crossing, tunnel, etc. other than a branch point. The street name data comprises data showing road type, such as expressway, municipal expressway, toll road, general road (national road, prefectural road, and others) and the data showing the actual street name, such as "ABC Street", "Triumphal Arch Street", etc.

The destination data includes, as shown in FIG. 4, destination road number, destination name, address and size of destination name voice data, destination direction data, and driving guidance data. The above destination name also includes directions. The destination direction data are the data giving information, such as invalid (destination direction data are not used), not necessary (no guidance provided), straight ahead, rightward direction, diagonally rightward direction, direction to return to right, leftward direction, diagonally leftward direction or direction to return to left. The driving guidance data is the data which provides guidance as to which lane the vehicle should be driven along in case there are two or more lanes and gives information, such as "bear right", "bear left", "bear toward center", or "no information".

Figure 5:
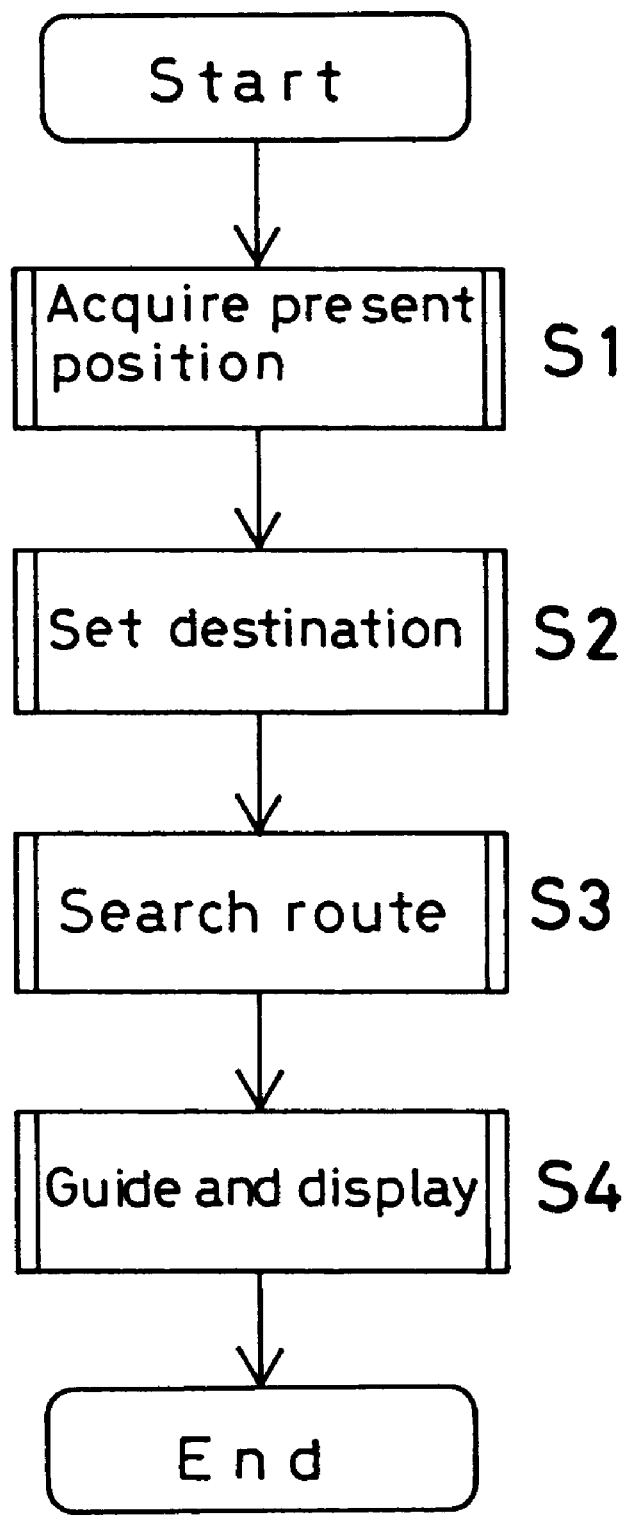
FIG. 5 is a flowchart of the system processing.

FIG. 5 is a flowchart of the complete navigation system according to the invention.

When the route guidance program is started by the CPU 51 of the central processing unit 4, the present position of the vehicle is detected by the present position detecting unit 2, and the vicinity around the present position is displayed as a vicinity map, and the name and other data of the present position are displayed (step S1). Next, the destination is set using a location name, facility name, etc., telephone number, address, stored waypoint, street name, etc. (step S2), and the optimal route from the present position to the destination is determined (step S3). When the route is determined, route guidance on the display is repeatedly updated until the vehicle reaches the destination (step S4) while tracing the present position using the present position detecting unit 2. In case an alternative route other than the suggested route is input before the vehicle reaches the destination, a searching area is set, an additional search is performed in the searching area, and route guidance is repeatedly provided until the vehicle reaches the destination.

Figure 6:
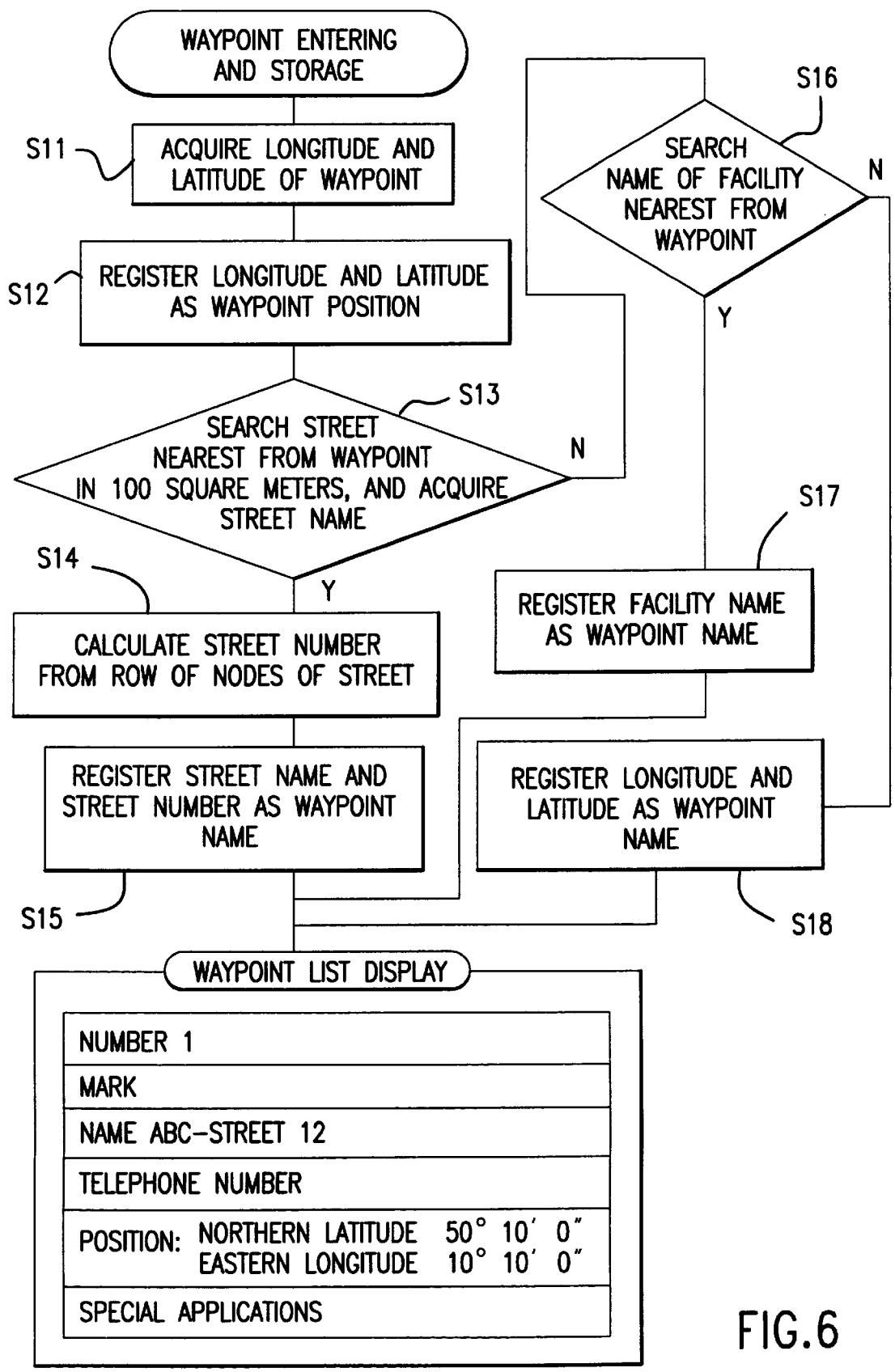
FIG. 6 is a flowchart of processing in the waypoint storage.
Figure 7:
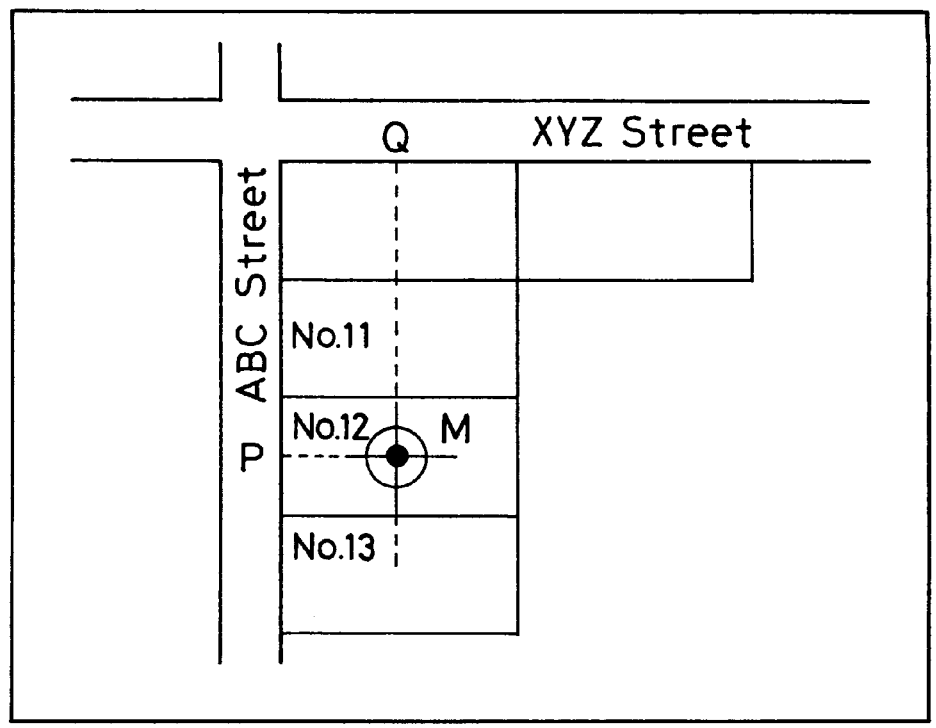
FIG. 7 shows locating of the nearest street.

Next, a description will be given on the processing of waypoint entering and storage by the central processing unit 4 in reference to FIG. 6 and FIG. 7.

Figure 1:
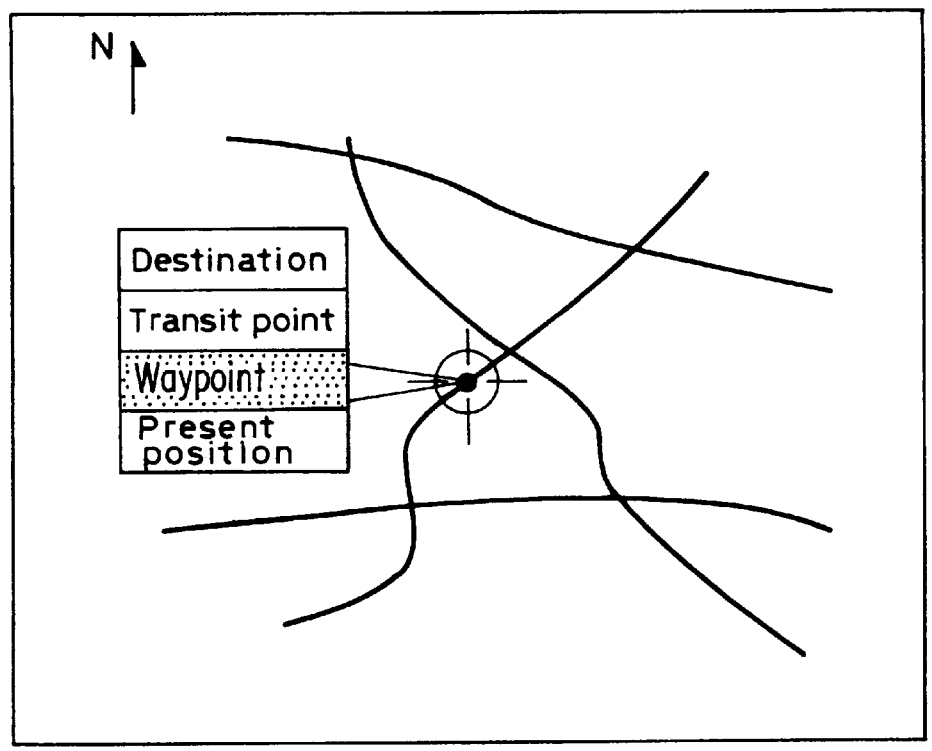
FIG. 1 is a drawing to show conventional type waypoint storage.

If the input operation key is operated when the guidance screen is displayed, a mode selection option is displayed (FIG. 1). If the waypoint button is operated when the cursor comes to the point to be entered and stored, the waypoint storage program is started by the CPU 51, as shown in FIG. 6.

First, from the map data file of the information storage unit 3, the longitude and latitude of the entered point specified by the cursor is read and acquired, and the longitude and latitude are stored as the position of the waypoint (S11 and S12). Next, a street nearest to the stored point is located in an area of 100 square meters, for example. From the guidance data shown in FIG. 4, the street name data is read, and the street name is acquired (S13). In this case, as shown in FIG. 7, ABC Street and XYZ Street are located in an area of 100 square meters from a waypoint M. A line perpendicular to each street is drawn from the waypoint M, and the distance MP to ABC Street is compared with distance MQ to XYZ Street, and it is then determined which street is closer to the waypoint. When the street nearest to the waypoint, i.e., ABC Street, is acquired, from a row of nodes of ABC Street (FIG. 4), the street number is calculated (S14). Then, the street name and street number are entered and stored as the waypoint name (S15) which is stored in the waypoint data file of the information storage unit 3.

In case a street cannot be located within an area of 100 square meters from the waypoint M, a facility nearest to the waypoint M is located using the distance between the position of the central coordinates and the waypoint (S16). The name of the facility is then entered and stored as the waypoint (S17). In case the facility nearest to the waypoint cannot be located, the longitude and latitude of the waypoint are entered and stored as the waypoint name (S18).

As a result, a selection from the menu screen can be made which will display a list of stored waypoints on the screen. The list of waypoints includes waypoint storage numbers (e.g., 1–100), logo marks showing classification such as parking area, grocery store, etc., names of waypoints including street name and number, telephone number, waypoint position (longitude and latitude), and special purpose data such as detour, etc. The name of the waypoint is basically expressed by street name and number. In case a street name and number cannot be found, it is expressed by facility name or by longitude and latitude. The waypoint list can be used for various purposes, such as setting a destination, transit point or present position or for confirming the address of the present position.

Next, an example of how a street number is determined will be described.

Figure 8A:
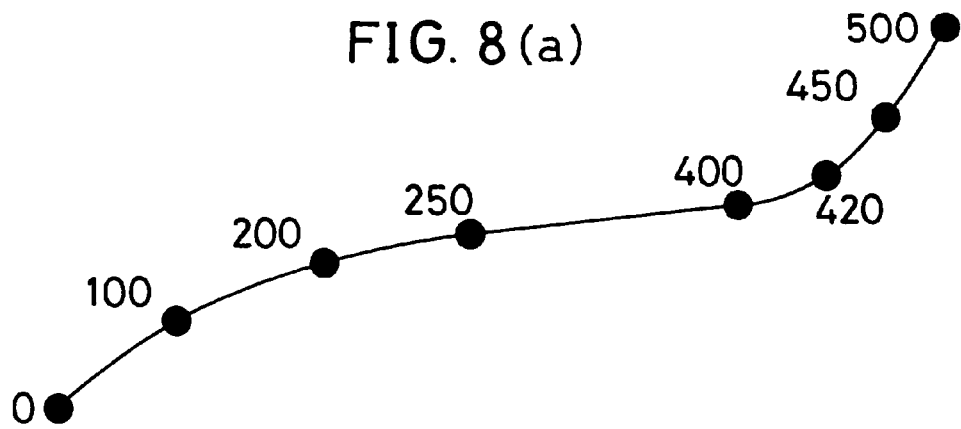
FIGS. 8(a) and 8(b) show how the street number is input.

FIG. 8(a) shows a road, which has street number 0 to 500. Black circles indicate nodes and a street number as shown in the figure, is assigned to each node. (For the street number of a node, see FIG. 4.) To assign street numbers in this case, the following three methods may be adopted:

(1) To a preset position, the nearest node from its coordinates is located, and its street number is entered and stored.

(2) By setting nodes to correspond to all street numbers. Each node is matched to each street number, 1:1.

(3) From the nodes currently stored, a proper street number is calculated.

Figure 8B:
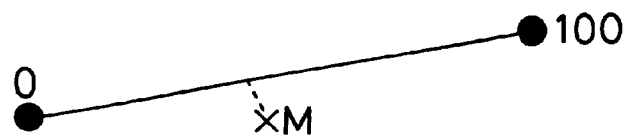

For example, as shown in FIG. 8(b), in case a waypoint M is entered between the street numbers 0–100, the street number 0–100 is assigned according to the method (1). In this case, if there is a node near the waypoint, the street number can be adequately set, and the method (1) may be adopted.

However, in the case of a long straight road where spacing between nodes is wide, a node distance from the waypoint may be selected and its street number may be entered and stored. In that instance, method (2) or method (3) should be used. Specifically, from the relation of the street number and the distance from the starting point and the end point, a proper street number corresponding to the waypoint can be calculated by proportional distribution.

For example, if a street number is determined for a street having one lane on one side as follows:

even street number for the outward course; and odd street number for the return course.

Then, even when the spacing between nodes is wide, it is possible to judge whether the street is an outward course or return course, and to calculate the correct street number. Also, in case of a one-way street, it is possible to calculate an adequate street number to the waypoint by proportional distribution from the relationship of the street number and the distance from the starting point to the end point.

Where the methods (1) and (3) are simultaneously used, and if the nearest node from the waypoint is within a given distance, the street number of this node may be used. If it is greater than a given distance, method (3) may be adopted.

Figure 9:
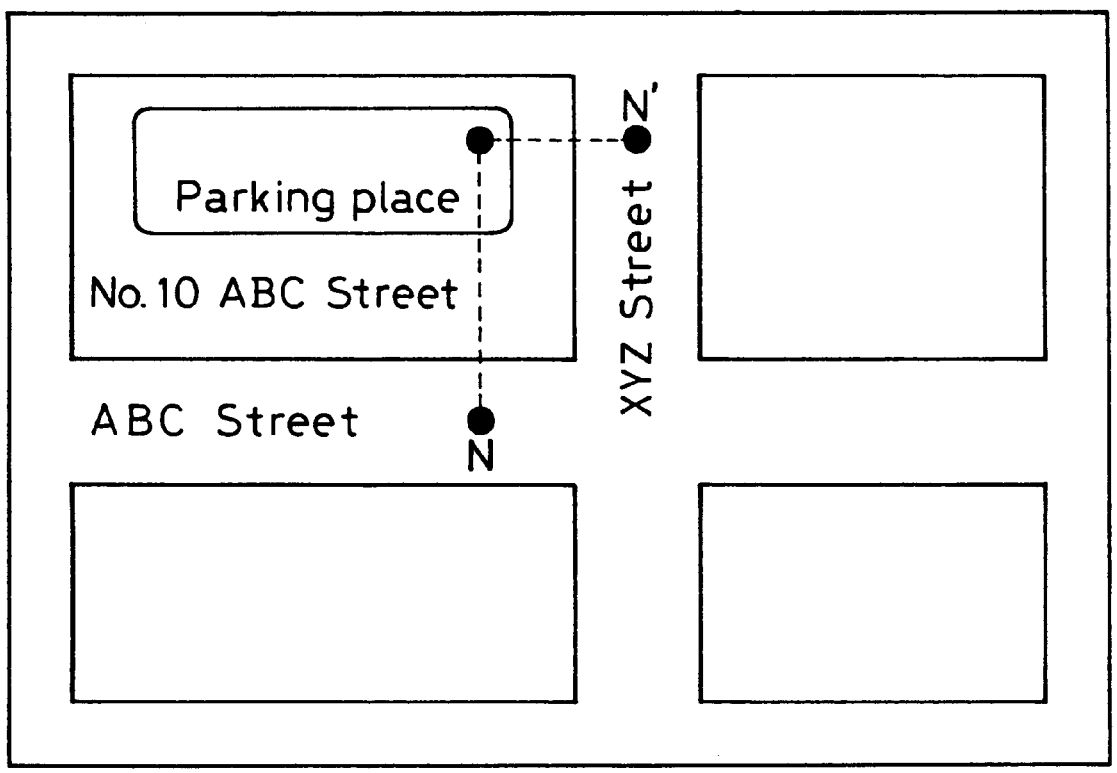
FIG. 9 illustrates problems when a street is located by nodes.

In the above embodiment, the street corresponding to the preset point is located by finding a node from the street data. Using this method, however, when the vehicle is in a parking area of a facility, the street may not necessarily be entered and stored in a proper manner. For example, as shown in FIG. 9, when a point is set in a parking area at No. 10 of ABC Street, and if the preset point is closer to a node N' of XYZ street than a node N of ABC Street, XYZ Street may be entered.

In this respect, a description will be given of another embodiment, in which such an inconvenience can be eliminated by the preparation of a structure configuration map data.

Figure 10:
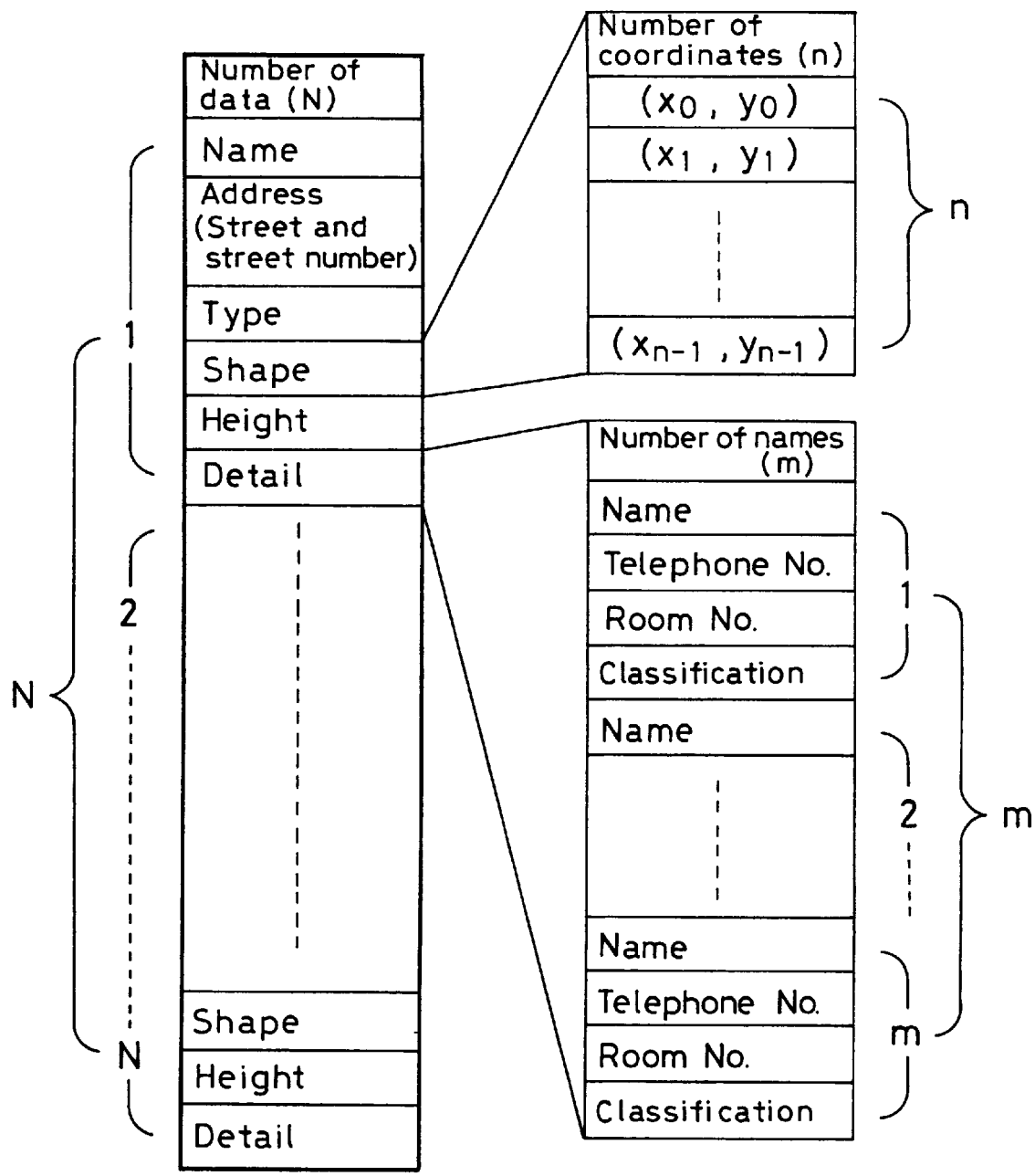
FIGS. 10(a) and (b) show the structure configuration map data.
Figure 10:
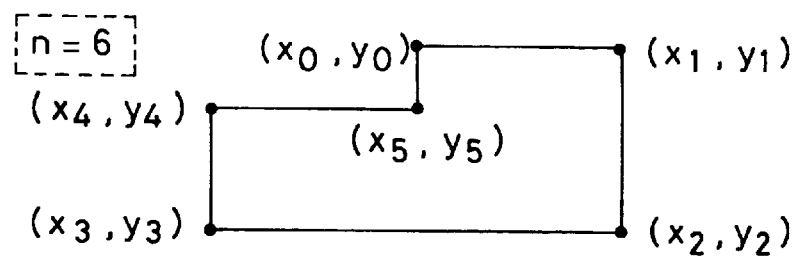

FIG. 10 shows the data structure of a structure configuration map which draws and displays various types of structure configurations, such as buildings (general housing, office building, condominium, fire department, department store, hospital, station, etc.), facilities (tower, park, amusement park, sports ground, etc.), bridges, roads, etc. The data is stored in the map data file of the information storage unit of FIG. 1 and contains rows of coordinates necessary to draw and display configurations of structures, name and address of the structure, various types of information relating to the structure, e.g., type of structure, height, details (such as residents), and other information such as telephone numbers.

For example, as shown in FIG. 10(a), data of each of "N" structures are stored after the number (N) of the structure data. The data of each structure contains name, address and type of structure, shape and height of structure, and other detailed information. The name of the structure is the name of building if it is a building, the name of the resident if it is a private residence, the name of facility if it is a facility, road type or street name such as "National Road No. 1" or "ABC Street" if it is a road, and the address including the street and street number of the structure. The configuration of the structure contains number (n) of coordinates expressing the configuration and coordinate values $(x_0, y_0), (x_1, y_1)$, . . . , $(x_{n-1}, y_{n-1})$, and the type of structure includes information, such as general housing, condominium, office building, public facility, road, park, etc. The height includes information, such as number of stories and height (in feet, meters, etc.). The detailed information relating to each tenant in the case of a tenant building includes the number (m) of tenants and individual information, such as name, telephone number, room number, classification (business type and details, such as restaurant, convenience store, etc.). As shown in FIG. 10(b), by sequentially reading coordinates relating to the configuration of the structure, connecting them by lines, and then drawing and displaying, the plane configuration of a building or a house or topographical feature of a park can be produced.

Figure 11:
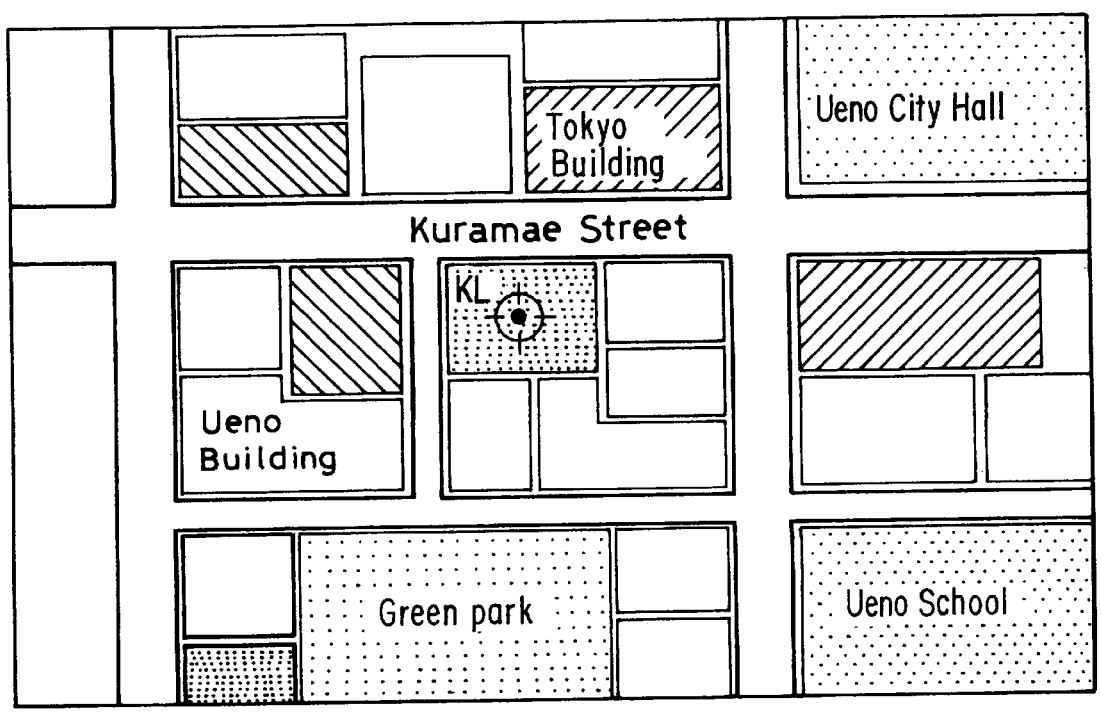
FIG. 11 is an example of the display for a structure configuration map.

FIG. 11 shows a display example of a structure configuration map, and names of a park, public facility and street are given as the names of structures. Further, some of the structures are displayed in different display modes. In case of a color display, colors, density and combinations of these may be used to display the structure in different modes. Thus, different display modes can be provided depending upon data type, height information, number of names, etc. For example, when public facilities such as a school, city hall, station, etc. or a park or tenant building, the buildings having a larger number of names can be displayed in a different display mode than normal, so that it is possible to more clearly distinguish the target object or features of the area displayed on the map.

As described above, the structure of configuration map data contains a street and street number as an address. For example, when the location of cursor (KL) in FIG. 11 is to be entered and stored, if cursor is moved to this location, the structure configuration map data is searched. If the street and street number are set as the address of this facility, the name of the street and street number are stored. In so doing, erroneous waypoint storage does not occur as in the case where a different street is located and stored, such when the location is determined merely from street data.

When the searching of a structure configuration map data is performed and if it is determined that street and street number are not set as an address, the street data shown in FIG. 4 may be used.

As described above, in waypoint storage, when a street name and number of the waypoint or the street nearest to the waypoint are used as the waypoint name, it is possible to pinpoint the position of the waypoint. If the name of the waypoint or the name of the street nearest to the waypoint cannot be located, the name of a facility nearest to the waypoint or longitude or latitude of the waypoint can be entered and stored as the waypoint name.

Next, street name input and map drawing processes by the central processing unit 4 is described in reference to FIGS. 12–17.

Figure 12:
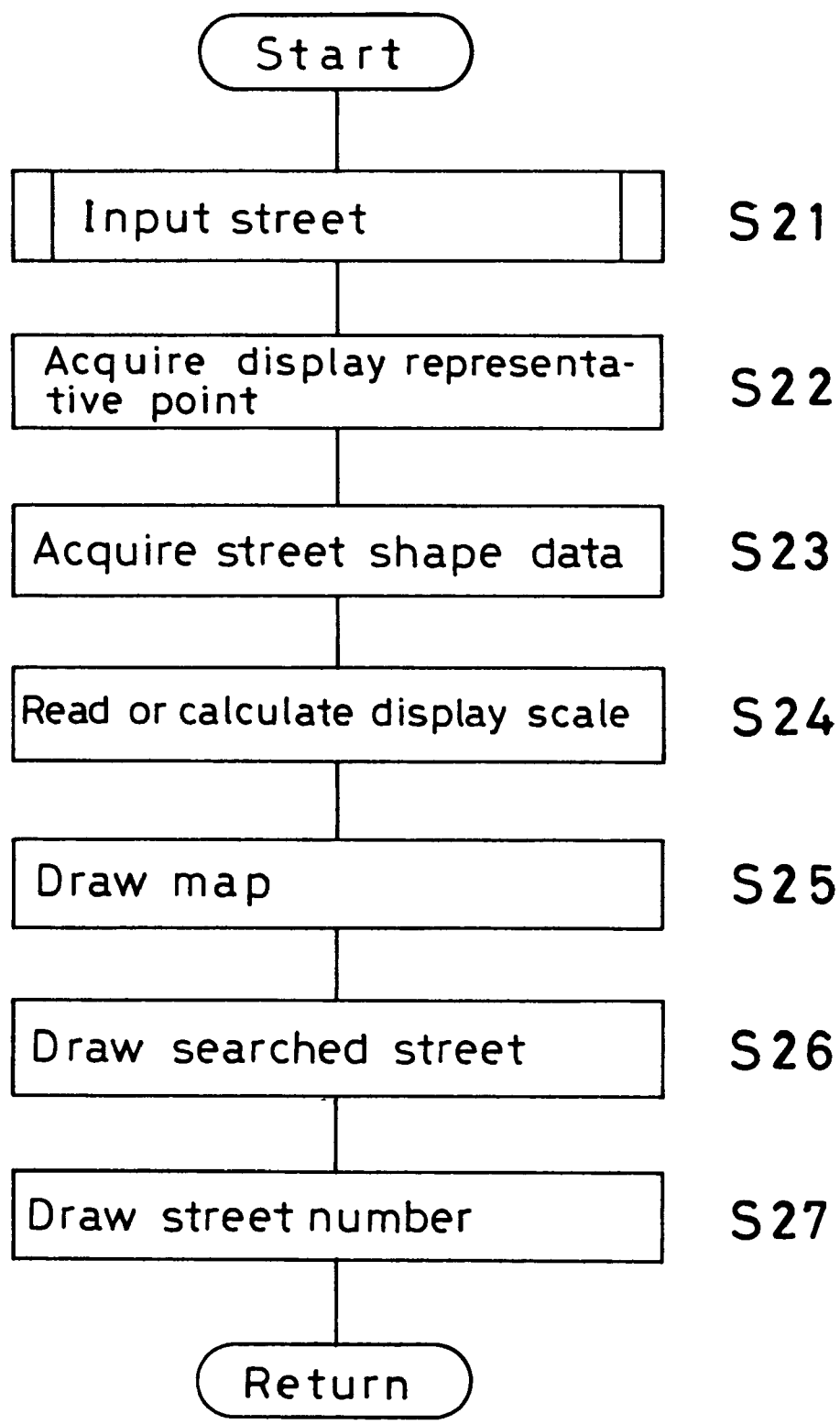
FIG. 12 is a flowchart of the street name input and display processing.

In the flowchart shown in FIG. 12, when the street name is input, input processing is executed (S21).

Figure 13:
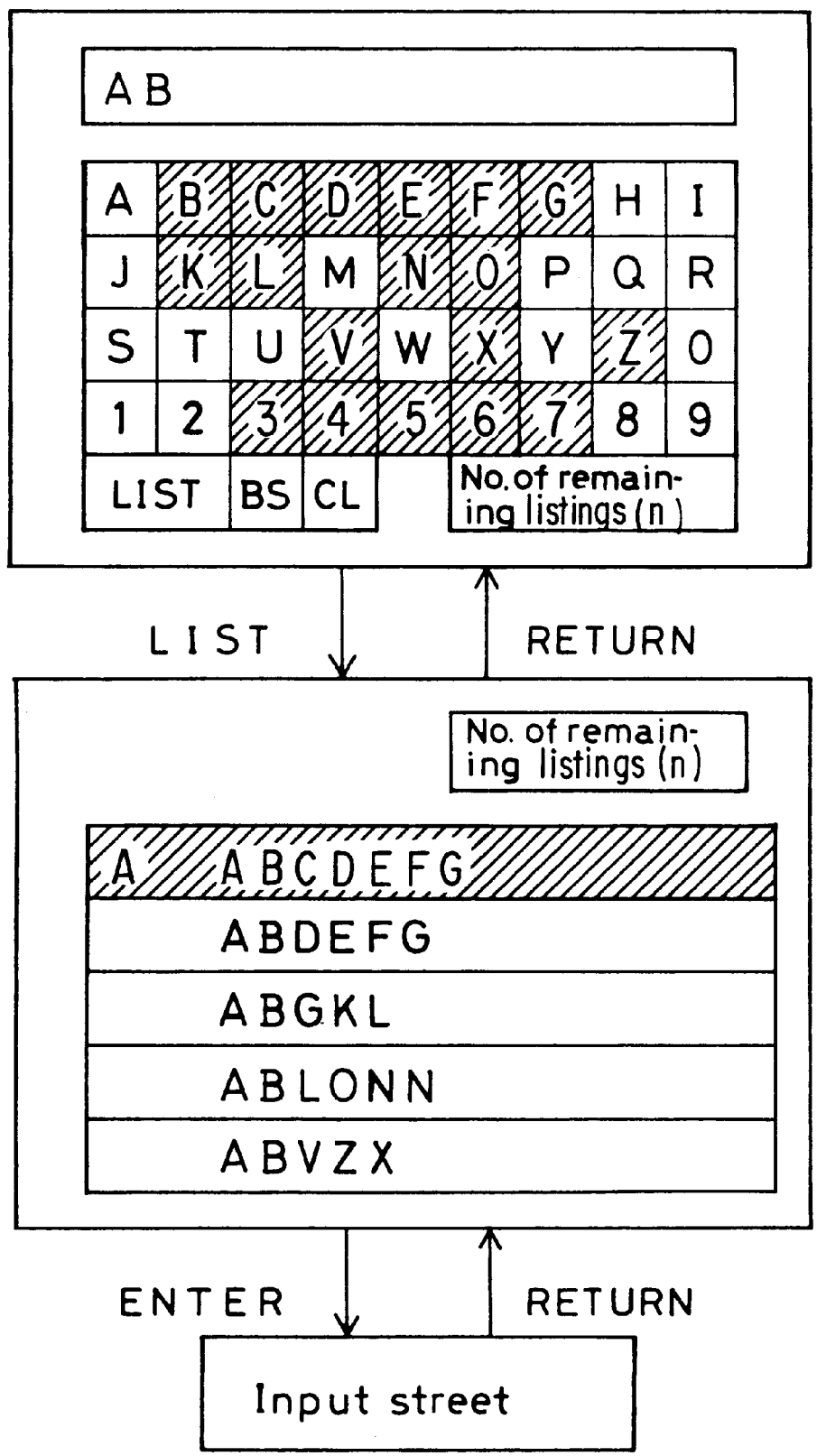
FIG. 13 shows the alphabetic input screen.

The entering of a street name is performed on an alphabetic input screen, as shown in FIG. 13, for example. When the foremost letter "A" and the second letter "B" of the street name are input, street data (FIG. 4) is read from the street data file of the information storage unit 3, the streets having the name with the first two letters "AB" are found, and a notice is displayed that the subsequent letters or numerics in the name are limited to "B, C, D, E, F, G, K, L, N, O, V, X, Z, 3, 4, 5, 6 or 7". At the same time, the number of the remaining listings is indicated as "n". When the column "LIST" on the screen is pressed, the names of all streets having the first two letters of "AB" are listed. It is then determined that the desired street name is the one is the shaded column, i.e., the name "ABCDEFG". When it is selected by key operation, remote control operation, etc., the street name is entered. Also, it is possible to return to a screen in the order of: "street input screen→listing display screen→letter input screen" by key operation. In case it is difficult to locate the desired street name on the listing display screen because there are too many listed names, the number of input letters should be increased. Then, the number of the remaining listed names decreases. When there are not many listed names, the listing display should be entered to select the street name. When letters are entered until the number of the listed names becomes one, the remaining street name is selected and input automatically or by key operation. The entering of letters may be performed not only from the touch panel on the input screen but also by voice if the voice input unit is provided.

Figure 14:
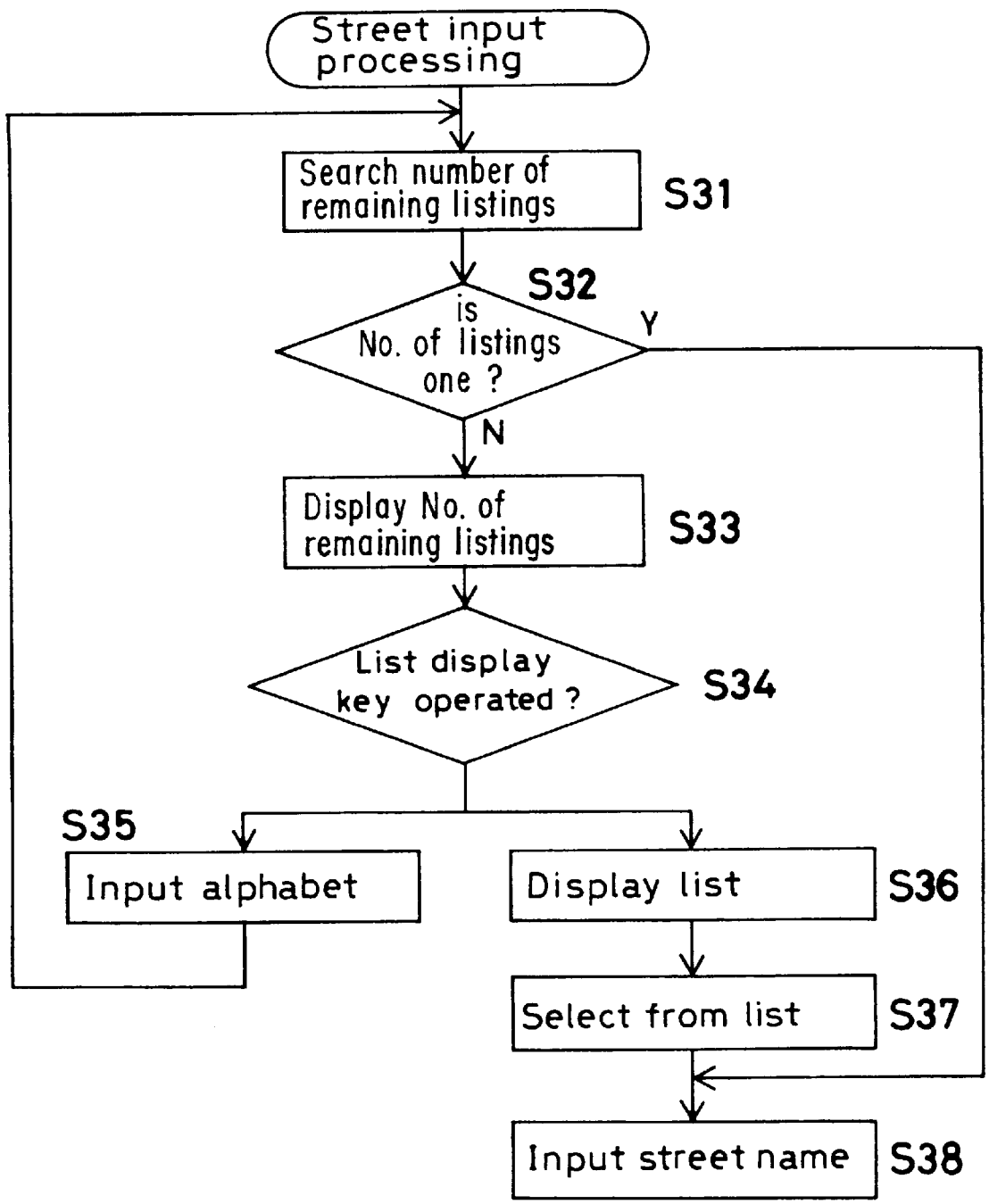
FIG. 14 is a flowchart of the street input processing.

In the street input processing, as shown in FIG. 14, when letters or numerics are input on the alphabetic input screen, the number of the remaining listings is searched each time one letter is input (S31). In case the number of listings is more than one, the number of the remaining listings is displayed on the screen (S32 and S33). Then, it is first determined whether a display key has been operated (S34), and then whether listing display processing should be performed or input processing should be continued. If a listing display key is not operated, alphabetic input processing is performed (S35). If the listing display key has been operated, the listing display is specified to display all relevant street names (S36) and the desired street name is located, selected and entered from them (S37 and S38). If only one listing remains, the remaining street name is input automatically or by key operation.

Figure 15:
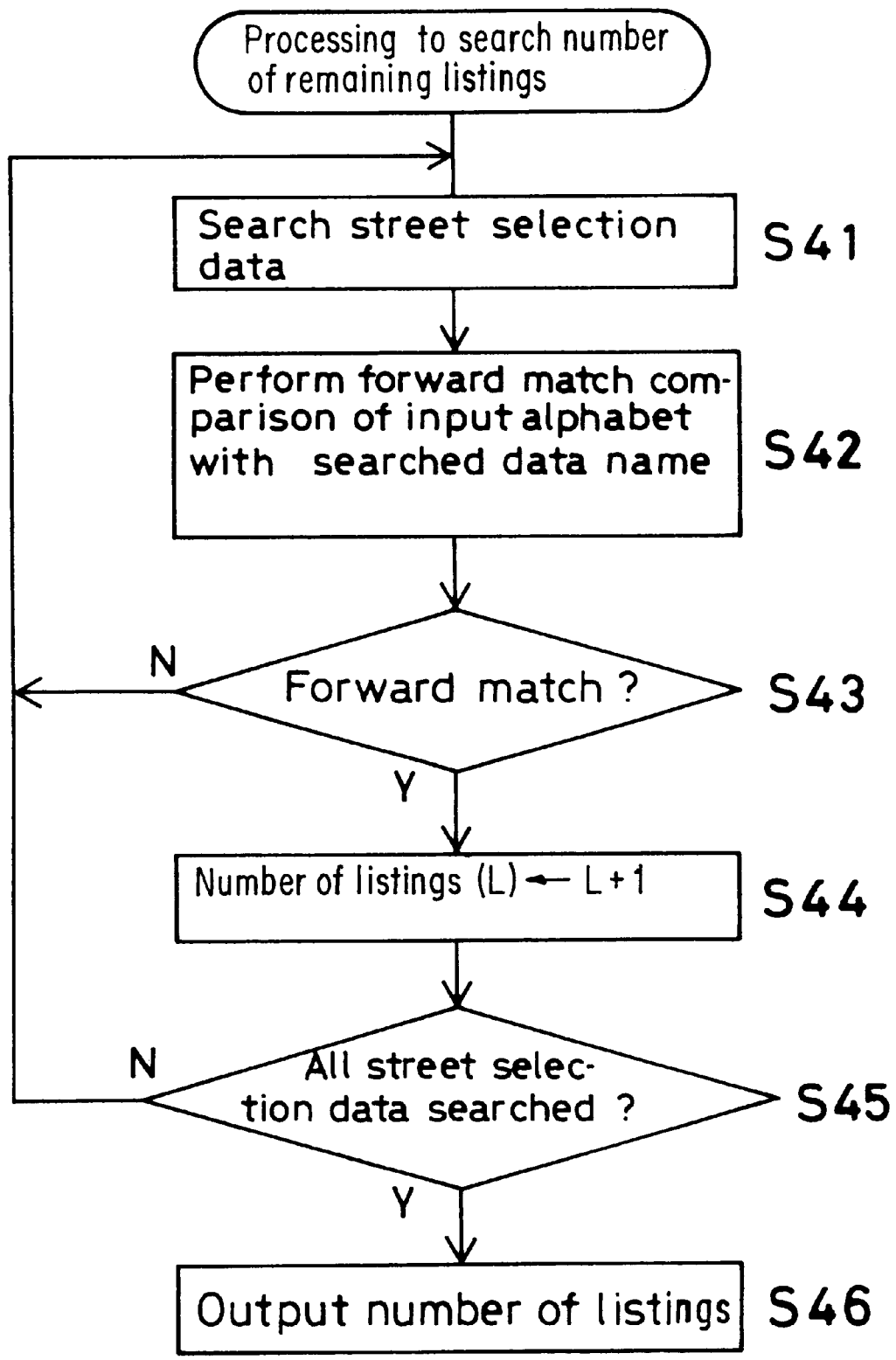
FIG. 15 is a flowchart of processing to search a number of the remaining listings.

FIG. 15 is a flowchart for searching the number of the remaining listings by forward match comparison.

When letters are input the street data is located (S41), and a forward match comparison is performed on the entered alphanumerics and the location data (S42). If they do not agree, the street data is further searched, and forward match comparisons are performed continuously. If a forward match is found, the number of listings (L) is increased by only one (S43 and S44), and this processing is executed until all data are searched. When searching is completed for all data, the number of listings is output (S45 and S46).

In the above, a description has been given in the case where the target name is input in alphabetical letters, while the procedure is the same in case other languages are used, such as Japanese, etc. The entering of a street is not limited to letter inputs as described above. For example, a list of streets may be displayed and the street may be input according to the list. If there are too many listings, they may be classified for each district or for each type to be displayed and selected. Although it is not shown in the figure, the map screen may be used and the desired street may be selected by moving cursor on the screen. Then, the display modes of all selected streets are changed to identifiable modes. By confirming this, the street name may be input by cursor operation.

Figure 2:
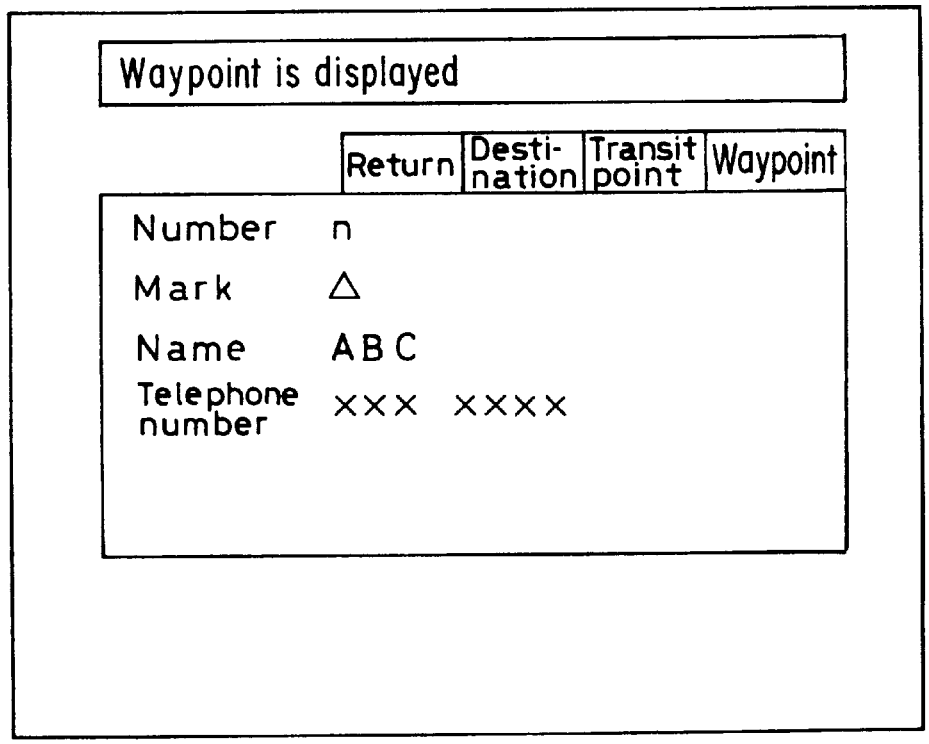
FIG. 2 shows conventional type waypoint storage.

Returning to FIG. 12, when a street name is input, a display representative point is incorporated (S22) by the street data (FIG. 4(a)). At the same time, from the street shape data (FIG. 2(b)), coordinates of longitude and latitude of each node on the street and street numbers are incorporated (S23). Then, the display scale set in the street data is read. If the display scale is not set, the scale is calculated by the street shape data (S24). Based on the display scale thus read or calculated, the street to be drawn on the screen is located. The coordinates of longitude and latitude of each node on the desired street are converted to screen coordinates, and a map is drawn (S25). Then, the desired street is drawn in a mode different from that of the other streets so that it can be easily identified, and the street number on the street is drawn (S25 and S27).

Figure 16A:
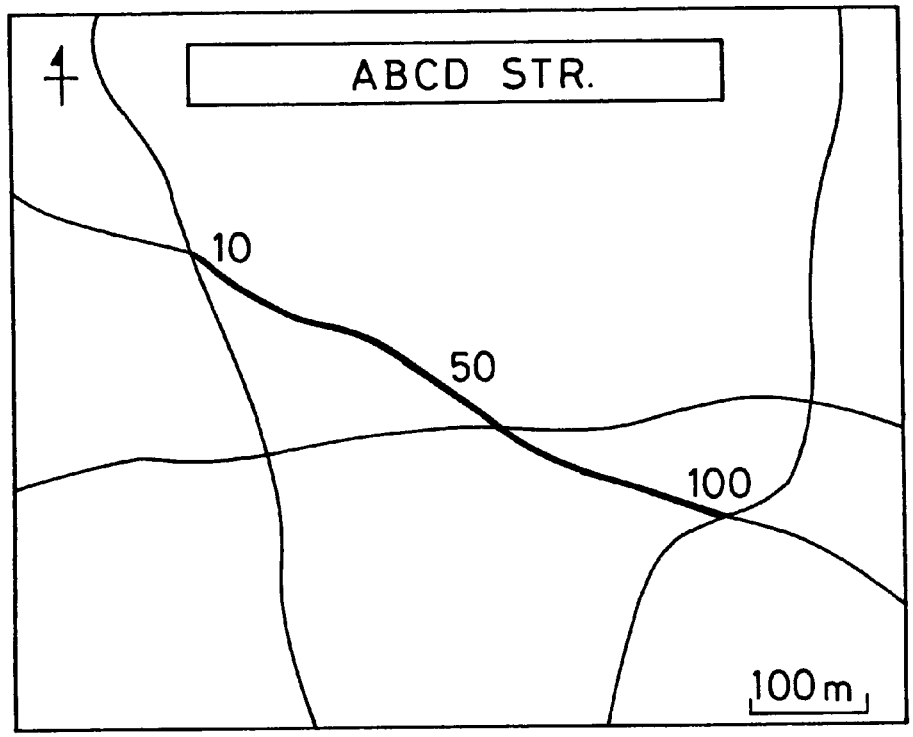
FIGS. 16(a) and 16(b) show an example of a displayed street.

FIG. 16(a) shows a display example of a street as short as several hundred meters. The display scale is set to 1/10000, and the relevant street is shown by a thick line. In addition, the display color of the relevant street may be changed or it may be flashed to facilitate identification. Also, the street numbers on the street are indicated as 10, 50 or 100.

Figure 16B:
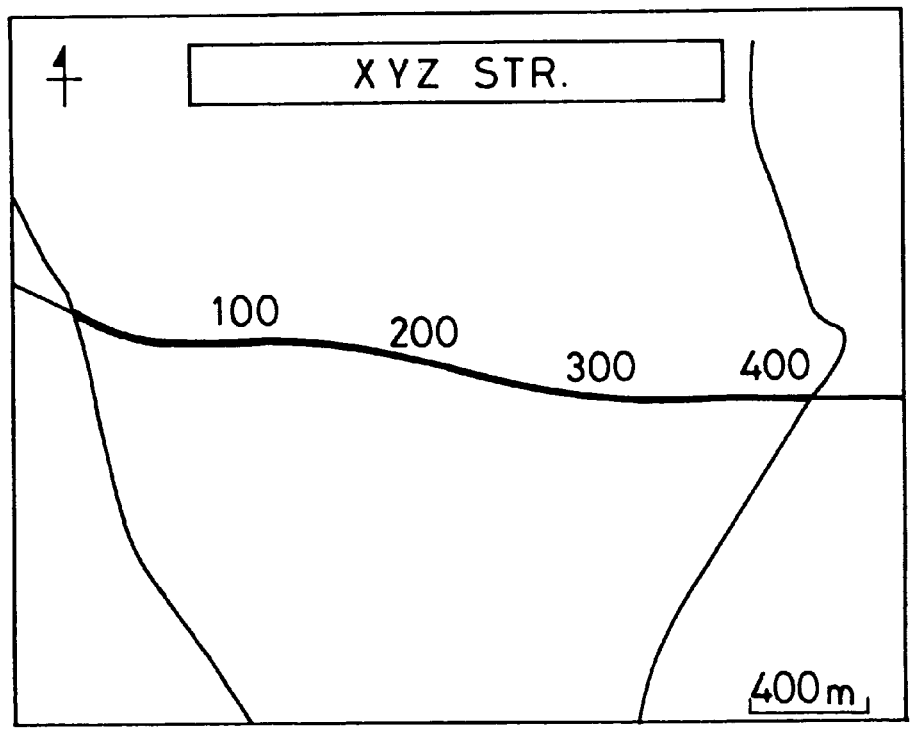

FIG. 16(b) is a display example of a street as long as several kilometers, and the display scale is 1/400000. The street is displayed in a different display mode from other roads to facilitate identification. At the same time, street numbers 100, 200, 300 and 400 are drawn.

To draw the street numbers, street numbers are given at the starting point and the end point. Between these points, street numbers having numerics with no fractions, etc., or street numbers of a display representative point are given, or street numbers are given in such manner that street numbers of the adjacent display streets are arranged with adequate spacing to correspond to the size of numerics to indicate the street number on the screen.

Figure 17A:
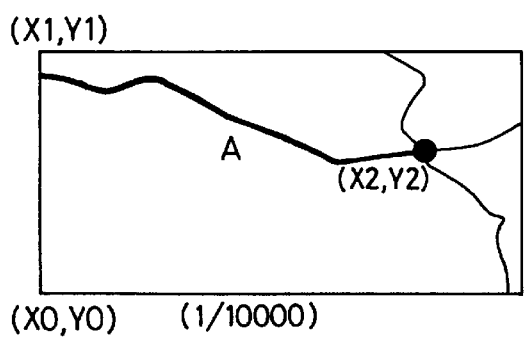
FIGS. 17(a) and 17(b) show a method to determine display scale.
Figure 17B:
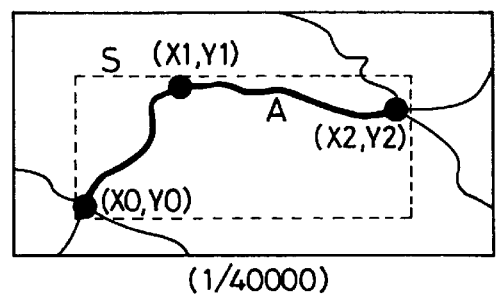

FIGS. 17(a) and 17(b) are drawings to help explain how the display scale ratio is determined.

FIG. 17(a) is a map in a scale 1/10000. On this map, two nodes, i.e., the node N0 (coordinate: X0, Y0) and the node N1 (coordinates: X1, Y1) are out of the display area, and the entire street cannot be displayed. However, in the map of 1/40000 shown in FIG. 17(b), the entire street is within the display area. Thus, the display scale ratio is determined to 1/40000, and the screen is displayed.

In this case, the first method to determine the display scale ratio includes steps to obtain the presence area of the node from position coordinates of all nodes of the street, and to arrange so that the obtained area is within the screen or within a given display area on the screen. For example, in FIG. 17(b), to a street A having a node N0 (screen coordinates: X0, Y0), a node N1 (Screen coordiantes: X1, Y1), and a node N2 (plane coordiantes: X2, Y2), the node presence area is obtained by X and Y coordiantes as a rectangular area S shown by a broken line in the figure. The area S is a rectangular area having vertexes (X0, Y0), (X0, Y1, (X2, Y1) and (X2, Y0), and a display scale ratio having a display area to include this area, is obtained by calculation.

The second method to determine the display scale ratio is as follows: From the most detailed map (e.g., a map of 1/10000 in scale), it is determined whether all nodes of the desired street are within the display area. If not, the display scale ratio is set to 1/20000, for example, and the adequacy of the scale is again determined in the same manner, If all nodes are still not within the display area, the scale ratio is increased gradually. When all nodes are within the display area, the display scale ratio (e.g., scale 1/4000 of FIG. 17(*b*)) is determined. When the display scale is increased gradually, the difference of scale ratios may be adequately set.

The above methods to determine the display scale ratio are given only for explanation, and the invention is not limited to these methods.

When the display scale is determined, the street may be within the display area or out of it depending upon where the center is when the street is drawn even when the scale ratio is the same.

Figure 18A:
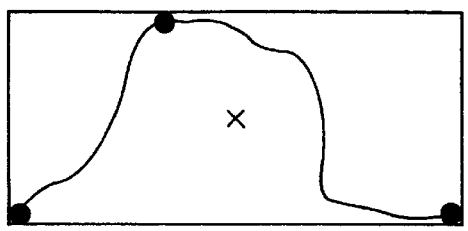
FIGS. 18(a) and 18(b) show the relationship between the display center and the display area.
Figure 18B:
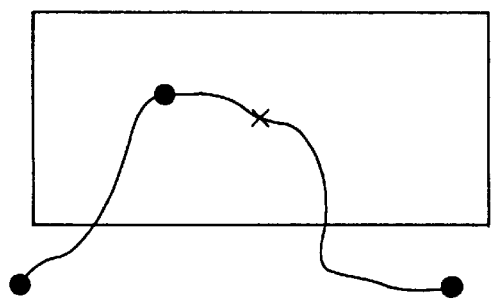

For example, FIGS. 18(*a*) and 18(*b*) each represent an example of display area where a street is displayed at the same scale ratio and size. In case of FIG. 18(*b*), a point (marked by x in the figure) on the street is set as the center coordinate of the display area. In FIG. 18(*a*), the center (marked by x in the figure) is set away from the street and aligned with the center coordinate of the display area. In FIG. 18(*b*), the two ends of the street are out of the display area, while, in FIG. 18(*a*), the two ends are within the display area. Therefore, when the display scale ratio is determined, more accurate display processing can be performed by calculating the area of the street using the screen coordinates and by aligning the center of the area with the center of the display area.

As described above, in a navigation system for vehicles where a street name is input, the entire street is displayed on a guidance screen regardless of the length, and it can be clearly distinguished from the other streets. Further, street numbers are displayed on the street. Accordingly, it is possible to easily set destination, present position, etc. by street name and number.

What is claimed is:

1. A navigation system for vehicles, comprising:

input means for inputting any desired point by marking a point on a displayed map;

storage means for storing a data relating to the displayed map;

position coordinates calculating means for calculating position coordinates of the desired point on the map input by said input means;

street name searching means for selecting a street based on a distance from the calculated position coordinates of the desired point, to a street in the vicinity of the desired point, and searching for the selected street name from the map data stored in the storage means;

registration means for registering the desired point by associating the street name searched by said street name searching means with the position coordinates calculated by said position coordinates calculating means;

display means for displaying the street name registered by said registration means in response to a request of a user; and destination setting means for setting the position coordinates registered by associating with the street name displayed by said display means as coordinates of the destination.

2. The navigation system for vehicles according to claim 1, wherein said street name searching means searches for a name of a street nearest to the position coordinates of any desired point input by said input means from said storage means.

3. The navigation system for vehicles according to claim 2, wherein said street name searching means calculates a distance from the input point to the street by drawing a perpendicular line from the input point to the street.

4. The navigation system for vehicles according to claim 3, wherein said street name searching means searches for a structure related to any desired point input by said input means under the condition that the street name could not be found, and said registration means registers a name of the searched structure.

5. The navigation system for vehicles according to claim 4, wherein said registration means registers position coordinates of the input point under the condition that said searching means could not find a structure related to any desired point input by said input means.

6. The navigation system for vehicles according to claim 1, wherein said street name searching means searches for a structure related to any desired point input by said input means under the condition that the street name could not be found, and said registration means registers a name of the searched structure.

7. The navigation system for vehicles according to claim 6, wherein said registration means registers position coordinates of the input point under the condition that said street name searching means could not search a structure related to any desired point inputted by said input means.

8. A navigation system for vehicles, comprising;

input means for inputting any desired point by marking a point on a displayed map;

storage means for storing map data and structure configuration map data stored therein;

position coordinates calculating means for calculating position coordinates of the desired point on the map input by said input means;

searching means for searching for structure configuration map data corresponding to the calculated position coordinates of the desired point from said storage means;

registration means for searching for the structure configuration map data stored in said storage means under the condition that said searching means could find the structure, for selecting a street based on a distance from the calculated position coordinates of the desired point, to a street in the vicinity of the desired point, and for searching for the selected street name from the map data stored in the storage means under the condition that said searching means could not find the structure, and for registering the desired point by associating the structure configuration map data or the street name searched by said searching means with the position coordinates calculated by said position coordinates calculating means;

display means for displaying the structure configuration map data or the street name registered by said registration means in response to a request of a user; and destination setting means for setting the position coordinates registered by associating with the street name displayed by said display means as coordinates of the destination.

9. The navigation system for vehicles according to claim 8, wherein said searching means searches for a structure nearest to any desired point input by said input means under the condition that the structure configuration map data or the street name could not be found, and said registration means registers the name of the searched structure.

10. The navigation system for vehicles according to claim 9, wherein said registration means registers position coordinates of the input point under the condition that said searching means could not find a structure related to any desired point input by said input means.

11. The navigation system for vehicles according to claim 8, wherein the structure configuration map data searched for by said searching means is an address of the structure.

12. The navigation system for vehicles according to claim 11, wherein the address of the structure searched by said searching means is a street name and a street number.

13. A method for registering and displaying a point on a map, comprising the steps of:

inputting any desired point marked on a displayed map;

selecting a street based on a distance from position coordinates of the desired point input to a street in the vicinity of the desired point, and searching the selected street name from map data relating to the displayed map;

registering the desired point by associating position coordinates of the searched point with the street name;

displaying the registered street name in response to a request of a user; and setting the position coordinates registered by associating the desired point with the displayed street name as coordinates of the destination.

* * * * *